(No Model.)

E. W. PERRY, Jr.
METHOD OF EXPOSING AND SHIFTING PHOTOGRAPHIC PLATES OR FILMS.

No. 458,980. Patented Sept. 1, 1891.

Witnesses.
Robert Pratt
J. A. Rutherford

Inventor.
Enoch W. Perry Jr.
By James L. Norris
Atty.

UNITED STATES PATENT OFFICE.

ENOCH WOOD PERRY, JR., OF NEW YORK, N. Y., ASSIGNOR OF ONE-HALF TO EMIL KIPPER, OF ADAMS, MASSACHUSETTS.

METHOD OF EXPOSING AND SHIFTING PHOTOGRAPHIC PLATES OR FILMS.

SPECIFICATION forming part of Letters Patent No. 458,980, dated September 1, 1891.

Application filed February 20, 1890. Serial No. 341,101. (No model.)

*To all whom it may concern:*

Be it known that I, ENOCH WOOD PERRY, Jr., a citizen of the United States, residing at New York, in the county of New York and State of New York, have invented new and useful Improvements in Methods of Exposing and Shifting Photographic Plates or Films, of which the following is a specification.

My invention relates to photographic processes; and the purpose thereof is to provide a simple method whereby a series of separate films or plates may be successively exposed and successively removed from the position of exposure and shifted to a suitable position in the plate-holder attached to the camera.

To this end my invention consists in the novel method of procedure hereinafter fully set forth, and then specifically pointed out in the claims following this specification.

Figure 1:
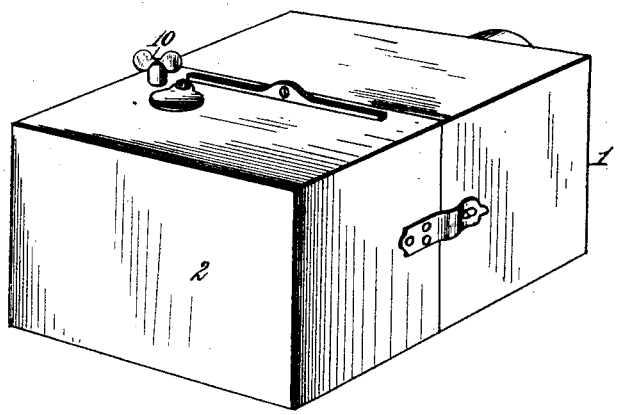
Figure 2:
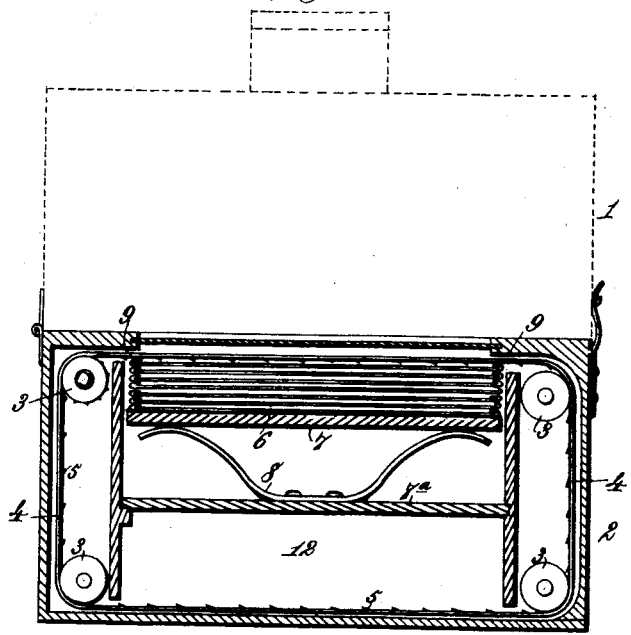
Figure 3:
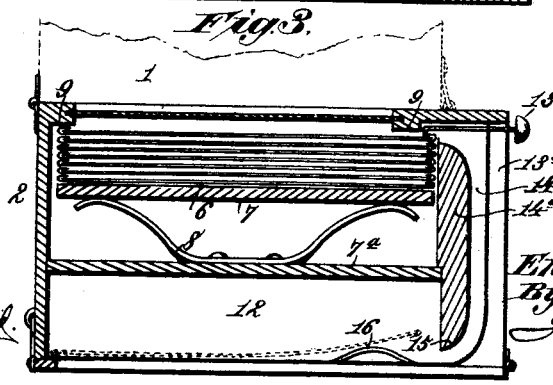

Referring to the accompanying drawings, in which I illustrate one form of apparatus adapted to the practice of my invention, Figure 1 is a perspective view of a camera and plate-holder embodying my invention. Fig. 2 is a horizontal section of the plate-holder shown in Fig. 1. Fig. 3 is a view showing a modified construction.

In the said drawings, the reference-numeral 1 denotes a camera of any suitable form, to which is hinged or otherwise detachably secured a plate-holder 2, having in its ends rolls 3, over which run bands or ribbons 4, which may be of any suitable material, steel being preferable. One or more of these bands may be supplied with teeth or grippers 5, for a purpose presently to be shown.

Within the space inclosed by the bands 4, I pile or stack a series of films or plates 6, which are fed forward or advanced by a plate 7, impelled by one or more springs 8. The foremost of these films or plates rests upon ways or supports 9 near their ends, and to enable them to be exposed separately and to receive a proper negative without affecting the ensuing plate, I mount upon or attach to each film a backing or lining of paper or fabric of such character as to intercept the actinic rays of the sun. This lining or backing may be of paper, cloth, zylonite, or other material. After exposure I move or shift the films from the position of exposure to the rear or other portion of the plate-holder, thereby exposing the ensuing or succeeding film, which is fed forward by the action of the spring-pressed plate 7. The exposed film may be removed by the bands or ribbons 4 by manipulating one of the rolls 3, which for this purpose is provided with a crank or key 10 outside the plate-holder. The band or bands provided with teeth or gripping devices engage with the ends of the films and carry the exposed or foremost plate with them as the rolls are turned. This film, being flexible, follows the general direction of the bands, and may follow them with accuracy, the film being carried into a receiving-chamber 12 in the rear of the spring-pressed plate 7 and the spring-supporting plate 7ª, where it is released and remains. I may, however, use other means for shifting the exposed film. For example, I may employ a hand-operated device 13, which moves in a horizontal slot 13ª in the wall of the plate-holder, said slot being cut far enough to permit the device 13 to move the film to one end or to the rear of the plate-holder, as the case may be. This device or carrier 13 may be of any form—as, for example, a hook, by which the ends of the films may be engaged. When this device is employed, it may be desirable to extend the end of the plate-holder to form a chamber 14, separated from the main portion by a bulkhead 14ª, the outer face of which is rounded or convex, passages 15 being formed at its ends to permit the movement of the films and the insertion of the carrier 13, in order to seize the end of the film. The means for shifting the films may, however, be varied almost infinitely, my invention consisting, broadly, in the method of exposing and successively shifting the flexible films from the position of exposure to the side or rear of the plate-holder.

In order to permit the successive removal of a series of stacked films without unnecessarily extending the dimensions of the plate-holder, I form the plates or films of flexible material, such as zylonite, whereby they may be bent or curved in passing from the exposed position to the receiving-chamber. Being thus constructed they may be readily shifted either by hand or mechanically, each film conforming to the curvature of the band or bands 4 as the latter pass over the rolls 3, or bending to pass over the convex-surface of the bulk-head 14ª. In this construction the slot 13ª may be lined with black fur to prevent the light from penetrating the camera through said slot.

When the teeth or grippers 5 are employed, they may be released from the ends of the film when the latter reaches the chamber 12 by reversing the movement of the latter; but I prefer to employ one or more strips 16, the ends of said strips having an upward inclination located near the passage 15 and just inside the chamber 12, whereby the ends of the films are raised out of engagement with the teeth of the belt, and are also held out of the way of the films which successively enter said chamber.

In order to stack the plates or pile them in the manner set forth, they are each provided with a non-actinic backing or lining.

I do not herein claim the combination, with a plate-holder of a plate-receiver arranged in rear thereof and a rotary transferring device, whereby the exposed plates are successively impelled from the position of exposure to the plate-receiver, as such is claimed in my application filed of even date herewith, Serial No. 341,102.

Having thus described my invention, what I claim is—

1. The method herein described, the same consisting in superposing a series of detached and independent flexible films in a photographic chamber, successively moving such detached films after exposure longitudinally, and thence laterally through a curved passage into a receiving-chamber and pressing the superposed series of films forward, substantially as set forth.

2. The method described, the same consisting in exposing a series of flexible films or plates arranged in a stack or pile, and after exposure transposing said plates successively to the rear or other part of the plate-holder by passing them through a curved passage or passages, substantially as specified.

3. The method herein described, the same consisting in superposing a series of detached and independent flexible films in a photographic chamber, successively moving such detached films after exposure longitudinally, thence laterally through a curved passageway, and thence to a position directly in rear of the superposed films in the photographic chamber and pressing the superposed series of films forward to be successively exposed, substantially as set forth.

In testimony whereof I have affixed my signature in presence of two witnesses.

ENOCH WOOD PERRY, JR.

Witnesses:
EDW. L. COWELL,
THOMAS FORD.